United States Patent [19]

Carlson et al.

[11] Patent Number: 5,258,824
[45] Date of Patent: Nov. 2, 1993

[54] IN-SITU MEASUREMENT OF A THIN FILM DEPOSITED ON A WAFER

[75] Inventors: David K. Carlson, Santa Clara; Russell Bowman, San Jose, both of Calif.

[73] Assignee: Applied Materials, Inc., Santa Clara, Calif.

[21] Appl. No.: 884,036

[22] Filed: May 14, 1992

Related U.S. Application Data

[63] Continuation of Ser. No. 564,995, Aug. 9, 1990, abandoned.

[51] Int. Cl.$^5$ .......................... G01B 11/06; G01J 5/00
[52] U.S. Cl. ...................................... 356/382; 356/43; 250/339; 250/342; 374/7; 374/121; 374/129
[58] Field of Search .................... 356/381, 382, 43, 45; 250/341, 342, 339; 374/7, 121, 129, 130, 124; 73/159

[56] References Cited

U.S. PATENT DOCUMENTS

| | | | |
|---|---|---|---|
| 2,264,968 | 12/1941 | DeForest | 374/7 |
| 2,750,791 | 6/1956 | Hanysz et al. | 374/7 |
| 3,413,474 | 11/1968 | Freeh | 374/7 |
| 3,536,405 | 10/1970 | Flower | 356/381 |
| 4,522,510 | 6/1985 | Rosencwaig et al. | 356/381 |
| 4,549,079 | 10/1985 | Terasaka et al. | 250/339 |
| 4,745,291 | 5/1988 | Niiya | 250/341 |
| 4,818,118 | 4/1989 | Bantel et al. | 374/7 |
| 4,919,542 | 4/1990 | Nulman et al. | 356/43 |
| 4,989,970 | 2/1991 | Campbell et al. | 356/382 |

OTHER PUBLICATIONS

Patent Abstracts of Japan, vol. 9, No. 129, "Measuring Device of Thickness of Powder Film", Jun. 1985.
Technisches Messes, vol. 49, No. 11, pp. 391-398, "Contactless Evaluation of Thickness of Surface Coatings With Thermal Effects", Nov. 1982.
"In-Process Thickness Monitor for Polycrystalline Silicon Deposition" T. I. Kamins and C. J. Dell'Oca, Journal Electrochemical Society, Jan., 1972, pp. 112-114.

Primary Examiner—Richard A. Rosenberger
Assistant Examiner—Hoa Q. Pham
Attorney, Agent, or Firm—John T. Wiedemann

[57] ABSTRACT

A method and apparatus is used to determine the thickness of a layer deposited on a specimen. For example, the thickness of a layer of polycrystalline may be measured as it is deposited over silicon oxide on a silicon wafer. The intensity of radiation emission at the top of the silicon wafer is detected. The temperature of the silicon wafer is measured and the variation in the intensity of radiation emission due to variation of the temperature is subtracted from the intensity of radiation emission detected at the top of the silicon wafer. The resultant signal is used to calculate the thickness of the polycrystalline silicon layer.

24 Claims, 5 Drawing Sheets

IN-SITU MEASUREMENT OF A THIN FILM DEPOSITED ON A WAFER

This is a continuation of copending application Ser. No. 07/564,995 filed on Aug. 9, 1990, now abandoned.

BACKGROUND

The present invention relates to the in situ monitoring and control of the thickness of a thin film during deposition on a wafer.

In conventional processes, polycrystalline silicon is deposited on oxidized silicon by chemical vapor deposition. It is important to accurately monitor and control the thickness of the layer of polycrystalline silicon as it is deposited. Typically this is done by complicated laser measurement system.

At least one attempt has been made to monitor the thickness of polycrystalline silicon deposition during its deposition using an infrared detector. See "In-Process Thickness Monitor for Polycrystalline Silicon Deposition", T. I. Kamins and C. J. Dell'Oca, *Journal Electrochemical Society*, January 1972, p. 112. This article describes the use of an infrared detector to observe the radiation emitted from an oxide-covered silicon wafer during the deposition of a polycrystalline silicon film on the oxide. However, the process did not provide a means to compensate for variations in radiation emissions which are due to variations in temperature or gas flow during processing.

SUMMARY OF THE INVENTION

In accordance with the preferred embodiment of the present invention, a method and apparatus are presented for determining the thickness of a layer deposited on a specimen. For example, the thickness of a layer of polycrystalline silicon may be measured as it is deposited over silicon oxide on a silicon wafer.

The intensity of radiation emission at the top of the silicon wafer is detected. This is done, for example, with one or more optical pyrometers. The emissivity varies with the thickness of the layer of polycrystalline silicon and with the temperature of the silicon wafer. In the present invention, the temperature of the silicon wafer is measured and the variation in the intensity of radiation emission due to variation of the temperature is subtracted from the intensity of radiation emission detected at the top of the wafer. The measurement of the temperature may be done, for example, by one or more optical pyrometers at the back of the wafer, or it may be done by a thermocouple. Once the emissivity variation due to variation of the temperature is subtracted, the resultant signal is used to calculate the thickness of the polycrystalline silicon layer.

The present invention allows for the monitoring of the thickness of a layer of polycrystalline silicon at the time of deposition. This monitoring may be done despite variations in temperature during processing time.

DESCRIPTION OF THE PREFERRED EMBODIMENT

Figure 1:
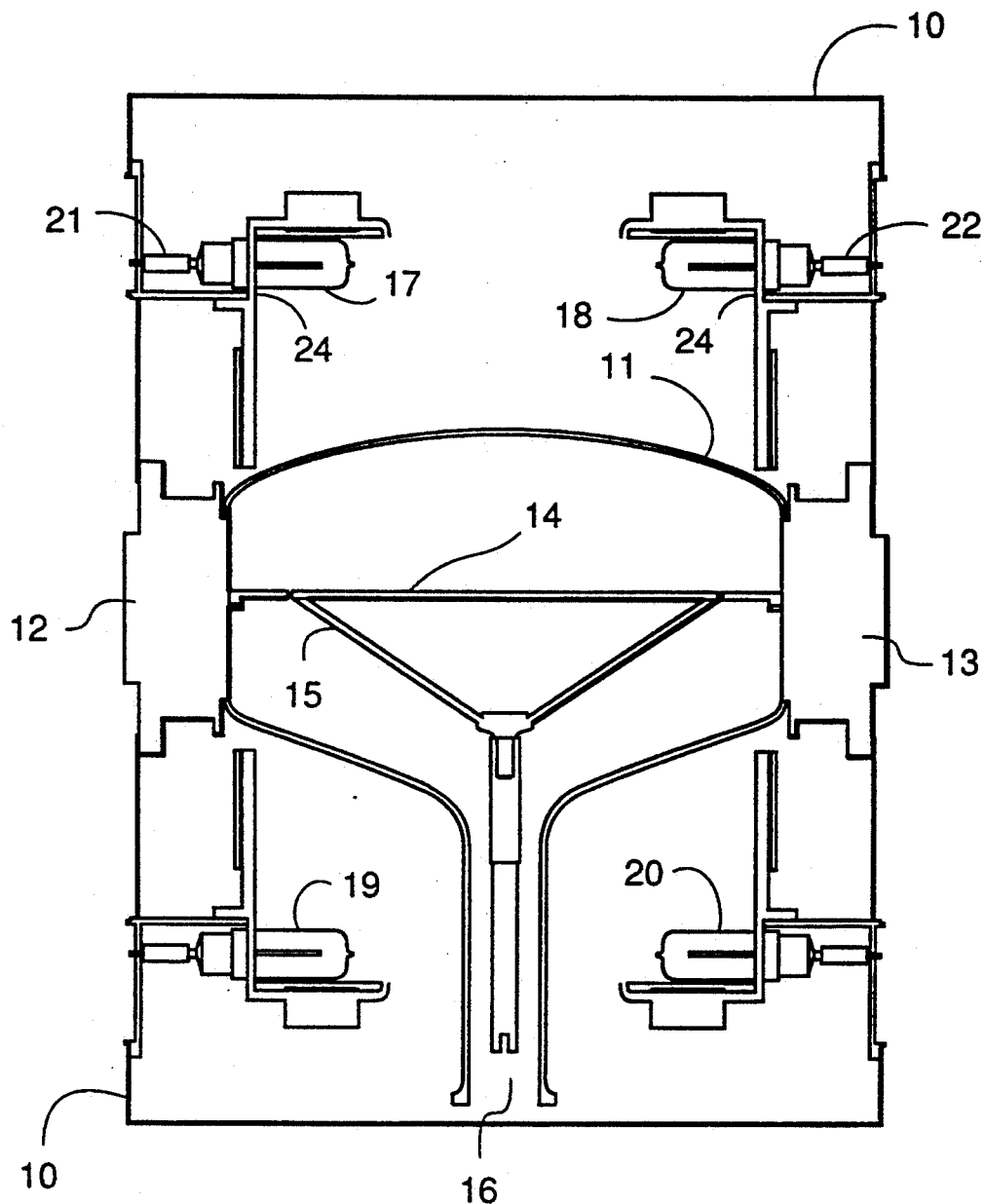
FIG. 1 shows a simplified cross-sectional view of a thermal reactor used for chemical vapor deposition.

In FIG. 1 is shown a cross-sectional view of a thermal reactor 11 used in chemical vapor deposition process. In the process, a layer of polycrystalline silicon is deposited upon a wafer 14. A wafer support structure 15 is used to support wafer 14. Wafer support structure 15 extends through a bottom aperture 16 of thermal reactor 11. This allows a drive assembly (not shown) to rotate wafer support structure 15 and thus wafer 14 during processing. This is done to enhance process uniformity.

During processing, gasses enter thermal reactor 11 through an entry port 12 and are removed through an exit port 13. Also during processing, heat is provided by infrared radiation bulbs, for example, an infrared radiation bulb 17, an infrared radiation bulb 18, an infrared radiation bulb 19 and an infrared radiation bulb 20. The infrared radiation bulbs are mounted on a support system 24 connected to housing 10. The walls of thermal reactor 11 are transparent allowing infrared radiation from the infrared radiation bulbs to freely enter thermal reactor 11 and heat wafer 14.

Figure 2:
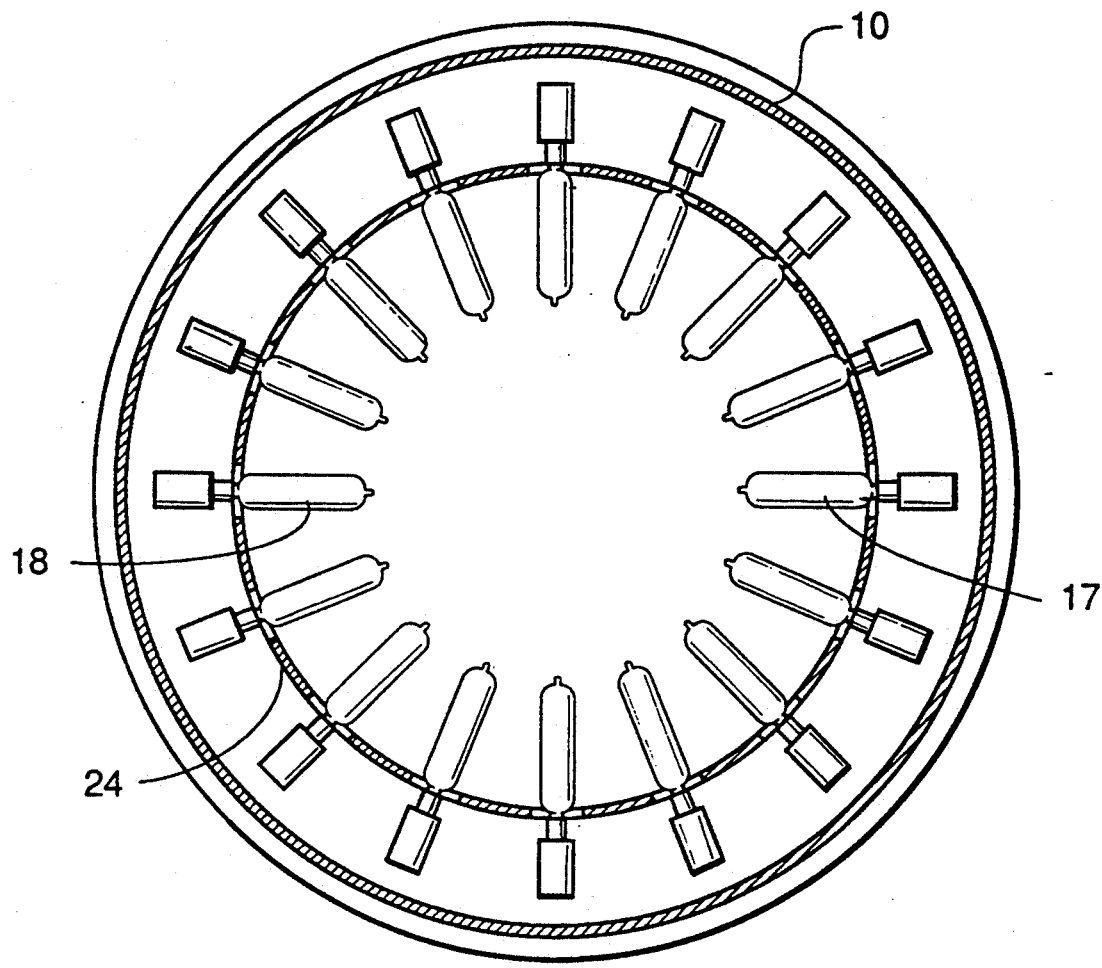
FIG. 2 shows a top view of part of the infrared heating system of the thermal reactor shown in FIG. 1.

FIG. 2 shows a top cutaway view of infrared radiation bulbs including infrared radiation bulb 17 and infrared radiation bulb 18. For a more complete description of thermal reactors used in semiconductor processing, see U.S. patent application Ser. No. 07/491,416 entitled Double-Dome Reactor for Semiconductor Processing.

Figure 3:
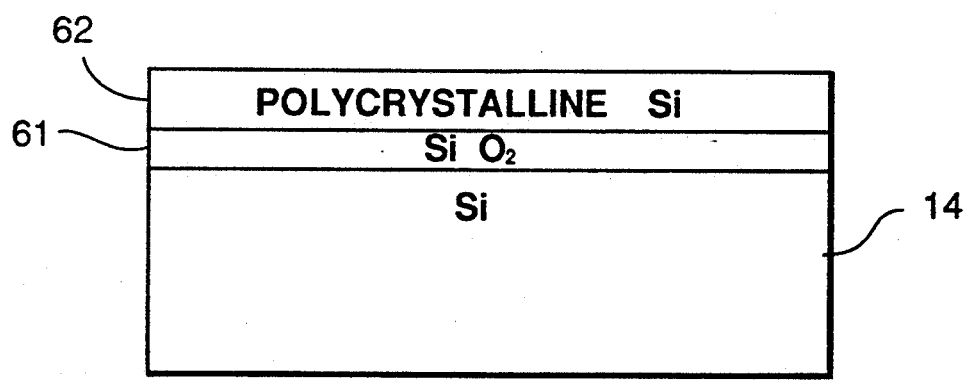
FIG. 3 shows a cross section of a silicon wafer upon which has been deposited a layer of polycrystalline silicon on top of an silicon oxide layer in accordance with the preferred embodiment of the present invention.

As illustrated by FIG. 3, during processing a layer 61 of silicon oxide and a layer 62 of polycrystalline silicon may be deposited on silicon wafer 14. A typical thickness of layer 61 is 1000 Angstroms. A typical thickness of layer 62 is 3000 Angstroms, although layer 62 may typically range from 50 to 10,000 Angstroms.

During processing, a certain amount of infrared radiation is absorbed by layer 61 and layer 62 and a certain amount is emitted. On the top of wafer 14, the amount of infrared radiation varies with the thickness of layer 62 and with the temperature of wafer 14. On the bottom of wafer 14, the amount of infrared radiation varies with the temperature of wafer 14. In the preferred embodiment of the present invention the radiation level at the top of wafer 14 and the radiation level at the bottom wafer 14 are measured. Using the measured level of infrared radiation it is possible to subtract out the change in infrared radiation from the top of wafer 14 resulting from variations in temperature. Once the subtraction has been performed, it is possible to determine the thickness of layer 62 based on the infrared radiation at the top of wafer 14.

Figure 4:
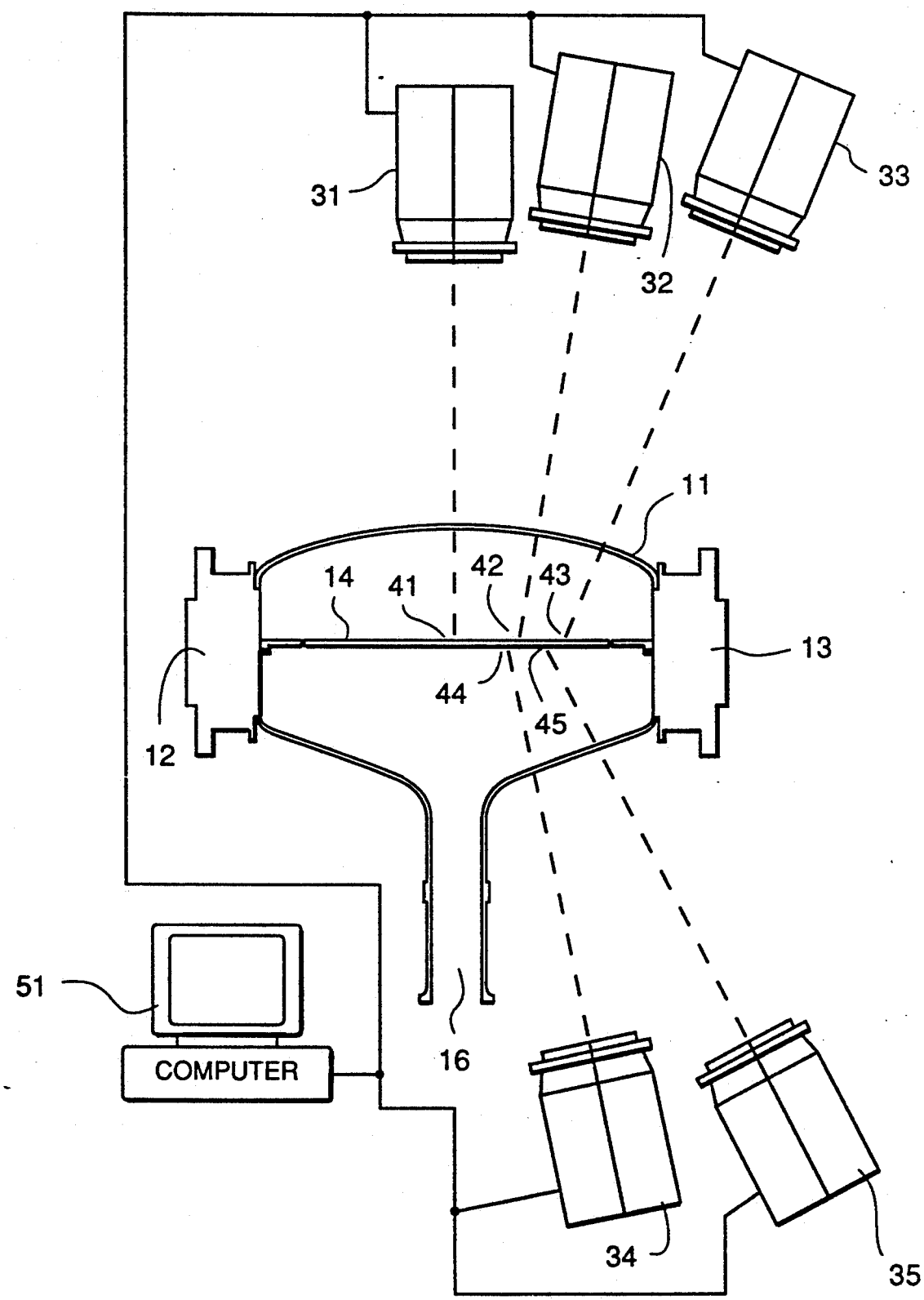
FIG. 4 shows a plurality of optical pyrometers arranged to monitor thickness of a polycrystalline silicon layer deposited in the thermal reactor shown in FIG. 1 in accordance with the preferred embodiment of the present invention.

FIG. 4 shows an optical pyrometer 31 placed to measure emission of infrared radiation at a point 41 on top of wafer 14. An optical pyrometer 32 is placed to measure emission of infrared radiation at a point 42 on top of wafer 14. An optical pyrometer 33 is placed to measure emission of infrared radiation at a point 43 on top of wafer 14. While a single optical pyrometer may be used to measure emission of infrared radiation at the top of wafer 14, a plurality of optical pyrometers may be used when it is desirable to monitor deposition uniformity of layer 62 of polycrystalline silicon.

Similarly, an optical pyrometer 34 is placed to measure emission of infrared radiation at a point 44 on the bottom of wafer 14. An optical pyrometer 35 is placed to measure emission of infrared radiation at a point 45 on the bottom of wafer 14. While a single optical pyrometer may be used to measure emission of infrared radiation from the bottom of wafer 14, a plurality of optical pyrometers may be used when it is desirable to monitor temperature uniformity across wafer 14.

Optical pyrometers 31-35 are, for example, able to measure temperature in the range of 500 degrees centigrade to 1250 degrees centigrade and detect a wavelength between two microns and four microns, for example 3.3 microns. Such an optical pyrometer is available from Ircon, Inc., having a business address of 7300 North Natchez Ave. Niles, Ill. 60648, or from Linear Labs, having a business address of 1290 Hammerwood Avenue, Sunnyvale, Calif. 94089.

Output of optical pyrometers 31-35 is received and evaluated by a computer 51. Computer 51 generates a current output which is converted to a voltage between zero and ten volts that is proportional to the temperature detected by optical pyrometers 31-35.

Figure 6:
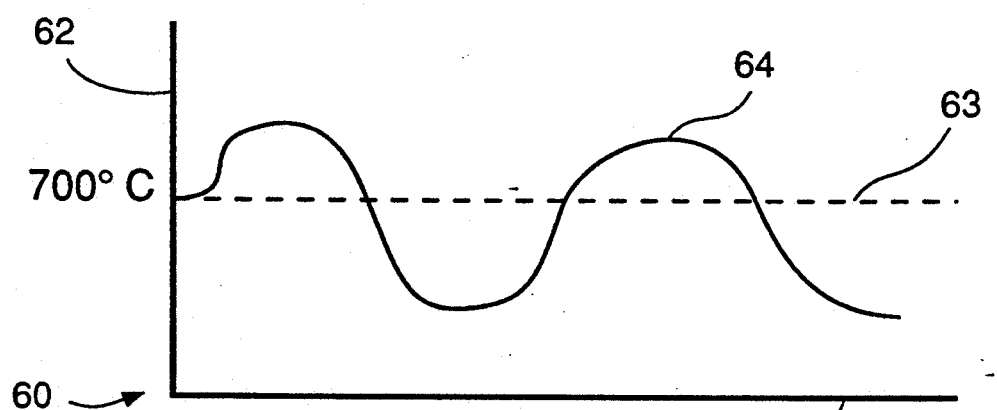
FIGS. 6, 7 and 8 shows signals plotted on graphs illustrating operation of the preferred embodiment in the present invention.

For example, FIG. 6 shows a measured signal 64 plotted on a graph 60. Graph 60 has a horizontal axis 61 which represents the passage of time, and a vertical axis 62, which represents the temperature optical pyrometer 31, optical pyrometer 32 and/or optical pyrometer 33 measure at the top of wafer 14. A reference line 63 indicates a measured temperature of 700 degrees centigrade.

Figure 7:
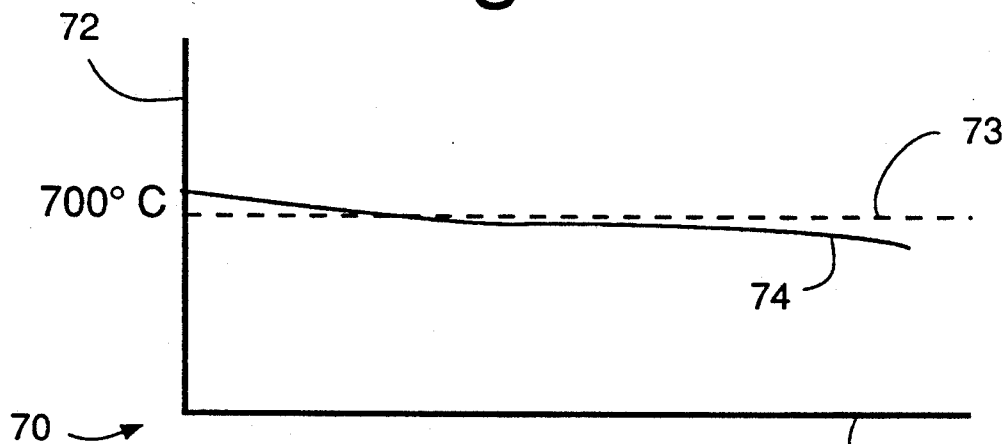

FIG. 7 shows a measured signal 74 plotted on a graph 70. Graph 70 has a horizontal axis 71 which corresponds to the passage of time as represented by horizontal axis 61 of graph 60. Graph 70 also has a vertical axis 72, which represents the temperature optical pyrometer 34 and/or optical pyrometer 35 measure at the bottom of wafer 14. A reference line 73 indicates a measured temperature of 700 degrees centigrade.

Figure 8:
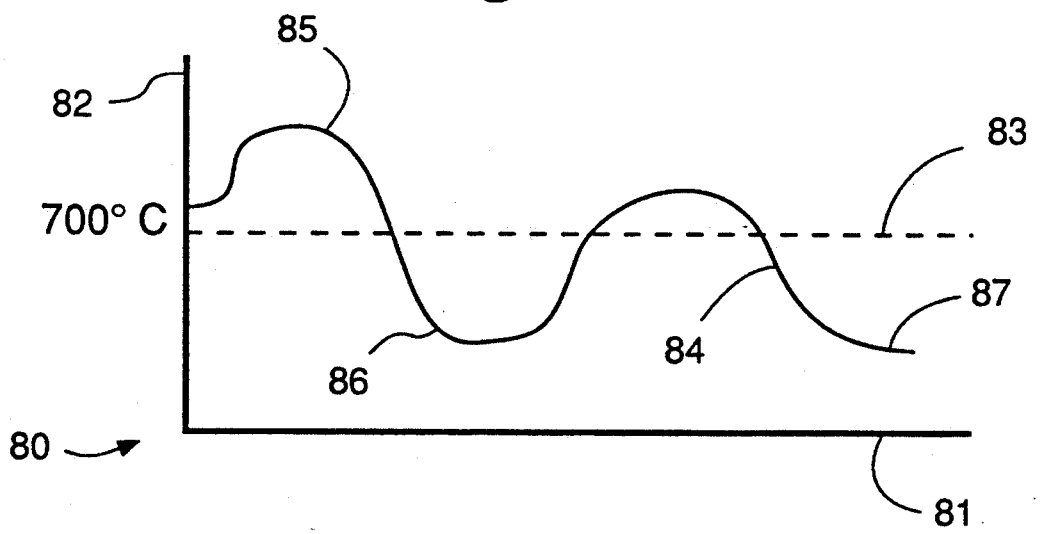

In order to generate an output which indicates changes in radiation emissions detected by optical pyrometer 31, pyrometer 32 and/or optical pyrometer 33 which are not due to changes in the temperature, computer 51 subtracts the amplitude of measured signal 74 from voltage amplitude of measured signal 64 to produce a calculated temperature differential signal 84 on a graph 80 as shown in FIG. 8. Graph 80 has a horizontal axis 81 which corresponds to the passage of time as represented by horizontal axis 61 of graph 60 and horizontal axis 71 of graph 70. A vertical axis 82 represents the measured radiation emitted from the top of wafer 14 which is not caused by changes in temperature. A reference line 83 is also shown.

Calculated temperature differential signal 84 may be used to monitor the thickness of layer 62 at processing time. For example, calculated temperature differential signal 84 may be generated for a specific process. Parameters of the process may include, for example, type of oxide film deposited, pattern in which a deposit is made, the deposition rate, temperature of deposit and the pressure within thermal reactor 11 or other deposition chamber during deposition.

Once the parameters have been set, one or more calibration test runs are performed and temperature differential signal 84 is calculated for each test run. The process parameters may be varied for each of the test runs. The thickness of deposited layer 62 is also measured for each test run.

Data from the calibrated test runs is used to determine at what time, relative to temperature differential signal 84, a desired thickness of the deposited layer 62 is reached for a given set of process parameters. The slope of the change in relative differential signal 84 may be calculated for the location where an optimal thickness of deposited layer 62 is reached. In subsequent production runs, for the specified parameters, the waveform and slope of relative differential signal 84 may be used to monitor and control the thickness of the deposited layer.

For example, for a selected set of parameters, the measured thickness of layer 62 was measured during a calibration run to be 600 Angstroms at a point 85 on calculated temperature differential signal 84, 3000 Angstroms at a point 86 and 6000 Angstroms at a point 87. In future production runs using the same selected set of parameters, the calculated temperature differential signal 84 can be used to monitor and control the deposition process, for example, allowing the process to be stopped when the desired thickness of deposited layer 62 is reached.

Also, once calculated temperature differential signal 84 is stored in computer 51 for a specific set of parameters, on subsequent production runs using the same specific set of parameters, the calculated temperature differential signal 84 for the production run may be compared to the calculated temperature differential signal 84 for the test run. The parameters of future production runs may then be adjusted to compensate for any deviations in the signals.

Figure 5:
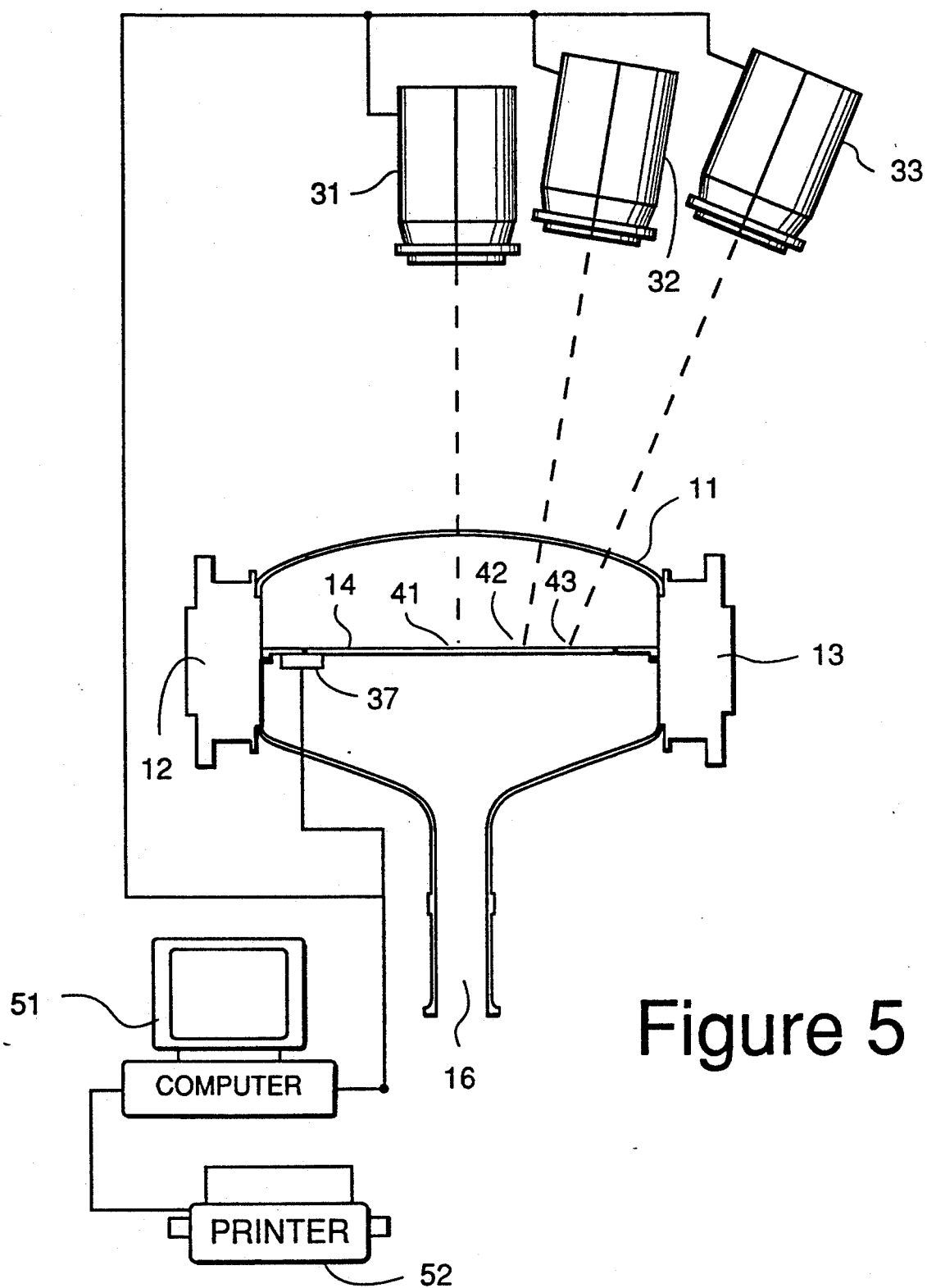
FIG. 5 shows an alternate embodiment of the present invention in which some of the optical pyrometers shown in FIG. 4 are replaced with a thermocouple in accordance with an alternate embodiment of the present invention.

In FIG. 5 optical pyrometers 34 and 35 are shown replaced by a thermocouple 37 in accordance with an alternate embodiment of the present invention.

We claim:

1. A method for monitoring the thickness of a layer deposited on a front surface of a specimen, the method comprising the steps of:
   (a) detecting the intensity of radiation emission at the front of the specimen;
   (b) subtracting from the intensity of radiation emission detected in step (a) changes in the intensity of radiation emission resulting from changes in temperature of the specimen to produce a remaining value; and,
   (c) calculating from the remaining value determined in step (b), the thickness of the layer.

2. A method as in claim 1 wherein in step (a) the intensity of radiation emission is detected by a plurality of optical pyrometers measuring intensity of radiation emission at different locations on the front surface of the specimen.

3. A method for monitoring the thickness of a layer deposited on a front surface of a specimen, comprising the steps of:
   (a) detecting the intensity of radiation emission at the front surface of the specimen;

(b) subtracting from the intensity of radiation emission detected in step (a) changes in the intensity of radiation emission resulting from changes in temperature of the specimen to produce a remaining value, wherein step (b) includes the substeps of:

(b1) measuring the temperature of the specimen; and (b2) subtracting from the intensity of radiation emission detected in step (a) an amount representing the intensity of radiation emission resulting from emissivity at the measured temperature of the specimen without the deposited layer; and (c) calculating from the remaining value determined in step (b) the thickness of the layer.

4. A method as in claim 3 wherein in step (b1) the temperature of the specimen is detected by an optical pyrometer measuring the intensity of radiation emission from a back surface, opposite the front surface of the specimen.

5. A method as in claim 4 wherein the specimen is a silicon wafer and the layer is polycrystalline silicon.

6. A method as in claim 5 wherein in step (a) the intensity of radiation emission is detected by an optical pyrometer measuring intensity of radiation emission at the front surface of the specimen.

7. A method as in claim 4 wherein in step (a) the intensity of radiation emission is detected by an optical pyrometer measuring intensity of radiation emission at the front surface of the specimen.

8. A method as in claim 3 wherein in step (b1) the temperature of the specimen is detected by a plurality of optical pyrometers measuring the intensity of radiation emission at different locations on a back surface opposite the front surface of the specimen.

9. A method as in claim 3 wherein in step (b1) the temperature of the specimen is detected by a thermocouple measuring the temperature on the specimen.

10. A method as in claim 3 wherein in step (a) the intensity of radiation emission is detected by an optical pyrometer measuring intensity of radiation emission at the front surface of the specimen.

11. A method as in claim 10 wherein the specimen is a silicon wafer and the layer is polycrystalline silicon deposited on silicon oxide.

12. A method as in claim 3 wherein in step (a) the intensity of radiation emission is detected by a plurality of optical pyrometers measuring intensity of radiation emission at different locations on the front surface of the specimen.

13. A method as in claim 3 additionally comprising the step of:

(d) varying processing parameters based on said remaining value.

14. A method for monitoring the thickness of a layer deposited on a front surface of a specimen, comprising the steps of:

(a) detecting the intensity of radiation emission at the front surface of the specimen;

(b) subtracting from the intensity of radiation emission detected in step (a) changes in the intensity of radiation emission resulting from changes in temperature of the specimen to produce a remaining value;

(c) calculating from the remaining value determined in step (b) the thickness of the layer; and (d) making at least one test run in which a layer is deposited on a front surface of a test specimen and in which the following substeps are performed:

(d1) detecting the intensity of radiation emission at the front surface of the test specimen;

(d2) subtracting from the intensity of radiation emission detected in step (d1) changes in the intensity of radiation emission resulting from changes in temperature of the test specimen to produce a test remaining value;

(d3) measuring the thickness of the layer deposited on said test specimen; and (d4) calibrating the calculation preformed in step (c) based on the ratio of the thickness measured in step (d3) to the test remaining value produced in step (d3).

15. An apparatus for detecting the thickness of a layer deposited on a front surface of a specimen within a processing chamber, the apparatus comprising:

a radiation detector for detecting intensity of radiation emission at the front surface of the specimen;

temperature compensation means, coupled to the detector, for subtracting from the intensity of the radiation emission detected by the detector changes in the intensity of radiation emission resulting from changes in temperature of the specimen to produce a remaining value; and, calculating means, coupled to the temperature compensation means, for calculating the thickness of the layer based on the remaining value.

16. An apparatus for detecting the thickness of a layer deposited on a front surface of a specimen within a processing chamber, the apparatus comprising:

a radiation detector for detecting intensity of radiation emission at the front surface of the specimen;

temperature compensation means, coupled to the detector, for subtracting from the intensity of the radiation emission detected by the detector changes in the intensity of radiation emission resulting from changes in temperature of the specimen to produce a remaining value, wherein the determining means includes:

measuring means for measuring the temperature of the specimen; and subtracting means, coupled to the measuring means and to the detector, for subtracting from the intensity of radiation emission detected by the detector an amount representing the intensity of radiation emission resulting from emissivity at the measured temperature of the specimen without the deposited layer; and calculating means, coupled to the temperature compensation means, for calculating the thickness of the layer based on the remaining value.

17. An apparatus as in claim 16 wherein the measuring means includes an optical pyrometer.

18. An apparatus as in claim 17 wherein the detector includes an optical pyrometer.

19. An apparatus as in claim 16 wherein the specimen is a silicon wafer and the layer is polycrystalline silicon.

20. An apparatus as in claim 16 wherein the measuring means includes a plurality of optical pyrometers measuring radiation emission at different locations on a back surface opposite the front surface of the specimen.

21. An apparatus as in claim 16 wherein the detector includes a plurality of optical pyrometers measuring radiation emission at different locations on the front surface of the specimen.

22. An apparatus as in claim 16 wherein the measuring means includes a thermocouple coupled to the specimen.

23. A method for monitoring a process in which a layer is deposited on a front surface of a specimen, the method comprising the steps of:
- (a) making at least one test run in which the following substeps are performed
  - (a1) detecting the intensity of radiation emission at the front surface of a test specimen during deposition of a test layer;
  - (a2) subtracting from the intensity of radiation emission detected in step (a1) changes in the intensity of radiation emission resulting from changes in temperature of the test specimen to produce a test remaining value; and
  - (a3) measuring the thickness of the test layer;
- (b) making at least one production run in which the following substeps are performed:
  - (b1) detecting the intensity of radiation emission at the front surface of a production specimen during deposition of a production layer;
  - (b2) subtracting from the intensity of radiation emission detected in step (b1) changes in the intensity of radiation emission resulting from changes in temperature of the production specimen to produce a remaining value; and
  - (b3) calculating, from the remaining value determined in step (b2) and data from the at least one test run, the thickness of production layer.

24. A method as in claim 23 wherein step (b) additionally comprises the substep of:
- (b4) varying processing parameters based on the remaining value determined in step (b3).

* * * * *